(12) United States Patent
Zhang et al.

(10) Patent No.: US 12,193,033 B2
(45) Date of Patent: Jan. 7, 2025

(54) MULTIMEDIA BROADCAST MULTICAST SERVICE CONFIGURATION METHOD, TERMINAL, AND NETWORK-SIDE DEVICE

(71) Applicant: VIVO MOBILE COMMUNICATION CO.,LTD., Guangdong (CN)

(72) Inventors: Yanxia Zhang, Chang'an Dongguan (CN); Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 402 days.

(21) Appl. No.: 17/591,822

(22) Filed: Feb. 3, 2022

(65) Prior Publication Data

US 2022/0159619 A1  May 19, 2022

Related U.S. Application Data

(63) Continuation of application No. PCT/CN2020/107756, filed on Aug. 7, 2020.

(30) Foreign Application Priority Data

Aug. 9, 2019  (CN) .......................... 201910736593.0

(51) Int. Cl.
*H04W 72/30* (2023.01)
*H04W 4/06* (2009.01)
(Continued)

(52) U.S. Cl.
CPC .......... *H04W 72/30* (2023.01); *H04W 24/02* (2013.01)

(58) Field of Classification Search
CPC . H04W 72/30; H04W 24/02; H04W 36/0007; H04W 4/06
See application file for complete search history.

(56) References Cited

U.S. PATENT DOCUMENTS

| 10,111,049 B2 * | 10/2018 | Shauh ...................... H04W 4/06 |
| 2011/0305183 A1 * | 12/2011 | Hsu ........................ H04W 72/30 370/312 |

(Continued)

FOREIGN PATENT DOCUMENTS

| CN | 101262630 A | 9/2008 |
| CN | 101547409 A | 9/2009 |

(Continued)

OTHER PUBLICATIONS

European Search Report in Application No. 20852800.0 Dated Jun. 30, 2022.

(Continued)

*Primary Examiner* — Kent Krueger
(74) *Attorney, Agent, or Firm* — BROOKS KUSHMAN P.C.

(57) ABSTRACT

Embodiments of this application provide a multimedia broadcast multicast service configuration method, a terminal, and a network-side device. The multimedia broadcast multicast service configuration method applied to the terminal includes: performing a configuration operation according to an indication of a network side, where the configuration operation is related to reception of a target MBMS; or autonomously performing a configuration operation and sending first information to a network side, where the first information includes first indication information that is used to indicate that the terminal has performed the configuration operation.

20 Claims, 7 Drawing Sheets

---

Autonomously perform a configuration operation, where the configuration operation is related to reception of a target MBMS — 31

Send first information to a network side, where the first information includes first indication information that is used to indicate that a terminal has performed the configuration operation — 32

(51) Int. Cl.
*H04W 24/02* (2009.01)
*H04W 36/00* (2009.01)

(56) References Cited

U.S. PATENT DOCUMENTS

| | | | |
|---|---|---|---|
| 2011/0305184 | A1 | 12/2011 | Hsu |
| 2012/0224577 | A1 | 9/2012 | Gou et al. |
| 2012/0275369 | A1 | 11/2012 | Zhang et al. |
| 2013/0294320 | A1 | 11/2013 | Jactat et al. |
| 2013/0301509 | A1 | 11/2013 | Purnadi et al. |
| 2014/0119265 | A1* | 5/2014 | Shauh .................. H04W 4/06 370/312 |
| 2014/0140260 | A1* | 5/2014 | Wang ............... H04W 36/0016 370/312 |
| 2015/0023243 | A1 | 1/2015 | Liu |
| 2015/0365963 | A1 | 12/2015 | Won et al. |
| 2016/0337818 | A1 | 11/2016 | Keskitalo et al. |
| 2018/0139665 | A1 | 5/2018 | Park et al. |
| 2019/0349976 | A1* | 11/2019 | Rudolf ................ H04W 72/23 |
| 2022/0159619 | A1* | 5/2022 | Zhang ................. H04L 12/189 |

FOREIGN PATENT DOCUMENTS

| | | |
|---|---|---|
| CN | 102300159 A | 12/2011 |
| CN | 102572713 A | 7/2012 |
| CN | 103202040 A | 7/2013 |
| CN | 104303550 A | 1/2015 |
| CN | 104717614 A | 6/2015 |
| CN | 104918277 A | 9/2015 |
| CN | 104937963 A | 9/2015 |
| JP | 2013534086 A | 8/2013 |
| JP | 2014-514877 A | 6/2014 |

OTHER PUBLICATIONS

CN Office Action in Application No. 201910736593.0 Dated Feb. 26, 2021.
"Issues on UE Autonomous Configuration of MBMS Frequency" 3GPP TSG RAN WG2 Meeting #85bis, CATT, R2-141540, Mar. 31, 2014.
Written Opinion and International Search Report in Application No. PCT/CN2020/107756 Dated Nov. 12, 2020.
Japanese Office Action issued in corresponding application No. 2022-507872, dated Jul. 31, 2023.
"3rd Generation Partnership Project; Technical Specification Group Radio Access Network; Evolved Universal Terrestrial Radio Access (E-UTRA) and Evolved Universal Terrestrial Radio Access Network (E-UTRAN);Overall description; Stage 2 (Release 15)," 3GPP TS 36.300, V15.6.0, pp. 1-365, (Jun. 29, 2019).
JP Office Action dated Jan. 23, 2023 as received in Application No. 2022-507872.

* cited by examiner

Perform a configuration operation according to an indication of a network side, where the configuration operation is related to reception of a target MBMS — 21

MULTIMEDIA BROADCAST MULTICAST SERVICE CONFIGURATION METHOD, TERMINAL, AND NETWORK-SIDE DEVICE

CROSS-REFERENCE TO RELATED APPLICATIONS

The present application is a bypass continuation application of International Application No. PCT/CN2020/107756 filed on Aug. 7, 2020, which claims priority to Chinese Patent Application No. 201910736593.0, filed in China on Aug. 9, 2019, which are incorporated herein by reference in their entirety.

TECHNICAL FIELD

Embodiments of this disclosure relate to the field of wireless communications technologies, and in particular, to a multimedia broadcast multicast service configuration method, a terminal, and a network-side device.

BACKGROUND

In a long term evolution (LTE) system, user equipment (also referred to as terminal, User Equipment, UE) uses a default configuration for multimedia broadcast multicast service (MBMS) reception. However, a network side is unclear whether the UE is performing MBMS reception and when the UE starts (or stops) the MBMS reception. Because a unicast and multicast reception processing capability (such as the layer 2 buffer (layer 2 buffer)) is shared among UEs, it is difficult for the network side to coordinate and manage unicast and multicast data transmissions of terminals if the network side is unclear about MBMS reception statuses of the UEs.

SUMMARY

Embodiments of this disclosure provide a multimedia broadcast multicast service configuration method, a terminal, and a network-side device.

This disclosure is implemented as follows:

According to a first aspect, an embodiment of this disclosure provides a multimedia broadcast multicast service configuration method, applied to a terminal and including:
performing a configuration operation according to an indication of a network side, where the configuration operation is related to reception of a target MBMS;
or
autonomously performing a configuration operation and sending first information to a network side, where the first information includes first indication information that is used to indicate that the terminal has performed the configuration operation.

According to a second aspect, an embodiment of this disclosure provides a multimedia broadcast multicast service configuration method, applied to a network-side device and including:
indicating a terminal to perform a configuration operation, where the configuration operation is related to reception of a target MBMS;
or
receiving first information sent by a terminal, where the first information includes first indication information that is used to indicate that the terminal has performed the configuration operation.

According to a third aspect, an embodiment of this disclosure provides a terminal, including:
a first configuration module, configured to perform a configuration operation according to an indication of a network side, where the configuration operation is related to reception of a target MBMS;
or
a second configuration module, configured to autonomously perform a configuration operation; and
a transmitting module, configured to send first information to the network side, where the first information includes first indication information that is used to indicate that the terminal has performed the configuration operation.

According to a fourth aspect, an embodiment of this disclosure provides a network-side device, including:
an indication module, configured to indicate a terminal to perform a configuration operation, where the configuration operation is related to reception of a target MBMS;
or
a receiving module, configured to receive first information sent by a terminal, where the first information includes first indication information that is used to indicate that the terminal has performed the configuration operation.

According to a fifth aspect, an embodiment of this disclosure provides a terminal, including a processor, a memory, and a computer program stored in the memory and capable of running on the processor, where when the computer program is executed by the processor, the steps of the multimedia broadcast multicast service configuration method applied to the terminal are implemented.

According to a sixth aspect, an embodiment of this disclosure provides a network-side device, including a processor, a memory, and a computer program stored in the memory and capable of running on the processor, where when the computer program is executed by the processor, the steps of the multimedia broadcast multicast service configuration method applied to the network-side device are implemented.

According to a seventh aspect, an embodiment of this disclosure provides a computer-readable storage medium, where a computer program is stored in the computer-readable storage medium, and when the computer program is executed by a processor, the steps of the multimedia broadcast multicast service configuration method applied to the terminal are implemented; or when the computer program is executed by a processor, the steps of the multimedia broadcast multicast service configuration method applied to the network-side device are implemented.

BRIEF DESCRIPTION OF DRAWINGS

Other advantages and benefits will become apparent to those of ordinary skill in the art by reading the following detailed descriptions of optional implementations. The accompanying drawings are merely intended to illustrate the purposes of the optional implementations, and should not be construed as a limitation on this disclosure. Throughout the accompanying drawings, the same reference numerals represent the same components. In the accompanying drawings.

DESCRIPTION OF EMBODIMENTS

In the specification and claims of this application, the terms "including", and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates the following three cases: only A, only B, or both A and B.

In the embodiments of this disclosure, terms such as "an example" or "for example" are used to represent an example, an instance, or an illustration. Any embodiment or design solution described as "an example" or "for example" in the embodiments of this disclosure shall not be interpreted as being more preferential or advantageous than other embodiments or design solutions. Specifically, the terms such as "an example" or "for example" are intended to present related concepts in a specific manner.

The following describes the embodiments of this disclosure with reference to the accompanying drawings. A multimedia broadcast multicast service configuration method, a terminal, and a network-side device provided in the embodiments of this disclosure may be applied to a wireless communications system. The wireless communications system may be a 5G system, an evolved long term evolution (eLTE) system, or a later evolved communications system.

Figures 1, 2:
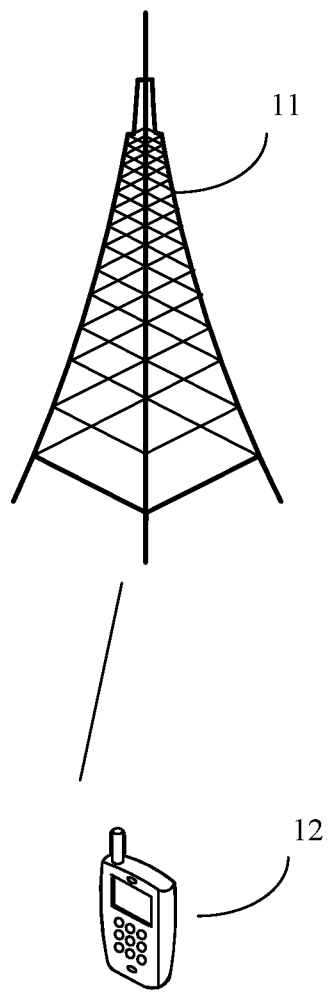
FIG. 1 is a schematic architectural diagram of a wireless communications system according to an embodiment of this disclosure.
FIG. 2 is a schematic flowchart of a multimedia broadcast multicast service configuration method according to Embodiment 1 of this disclosure.

FIG. 1 is a schematic architectural diagram of a wireless communications system according to an embodiment of this disclosure. As shown in FIG. 1, the wireless communications system may include a network-side device 11 and a terminal 12. The terminal 12 may be connected to the network-side device 11. In practical applications, connection between the devices may be a wireless connection. For ease of visually representing the connection relationship between the devices, a solid line is used to indicate that in FIG. 1.

It should be noted that the foregoing communications system may include a plurality of terminals 12, and the network-side device 11 may communicate with the plurality of terminals 12 (transmitting signaling or data).

The network-side device 11 provided in this embodiment of this disclosure may be a base station, and the base station may be a base station commonly used, or may be an evolved base station (evolved node base station, eNB), or may be a network-side device (such as a next generation base station (next generation node base station, gNB) or a transmission and reception point (TRP) in a 5G system, or a cell. Alternatively, the base station may be a network-side device in a later evolved communications system.

The terminal 12 provided in this embodiment of this disclosure may be a mobile phone, a tablet computer, a notebook computer, an ultra-mobile personal computer (UMPC), a netbook, a personal digital assistant (PDA), or the like.

Referring to FIG. 2, FIG. 2 shows a multimedia broadcast multicast service configuration method according to Embodiment 1 of this disclosure. This method is applied to a terminal and includes the following step.

Step 21: Perform a configuration operation according to an indication of a network side, where the configuration operation is related to reception of a target MBMS.

The target MBMS may be one MBMS, or may be a plurality of MBMSs.

In this embodiment of this disclosure, the terminal performs, according to the indication of the network side, the configuration operation related to reception of the target MBMS. In this way, the network-side device is able to control MBMS reception of the terminal, so as to perform unicast and multicast coordination and management, for example, reducing unicast service transmission when the terminal needs to perform MBMS reception, thereby ensuring that unicast and multicast transmission within a scheduling time does not exceed a total capacity of the terminal (such as a total layer 2 buffer capacity of the terminal).

In this embodiment of this disclosure, optionally, the network side may indicate explicitly the terminal to perform the configuration operation related to reception of the target MBMS.

That is, step 21 may include the following steps:

Step 211A: Receive second indication information delivered by the network side, where the second indication information is used to indicate whether the terminal is to perform the configuration operation.

The second indication information may be, for example, 1 bit, where 1 means indicating the terminal to perform the configuration operation, and 0 means indicating the terminal not to perform the configuration operation; or 1 means indicating the terminal not to perform the configuration operation, and 0 means indicating the terminal to perform the configuration operation.

If the second indication information indicates that the terminal is to perform the configuration operation, the terminal performs the configuration operation; or if the second indication information indicates that the terminal is not to perform the configuration operation, the terminal does not perform the configuration operation.

In this embodiment of this disclosure, optionally, in addition to delivering the second indication information to the terminal, the network-side device may further deliver configuration information for performing the configuration operation, for example, carrying an MBMS secondary cell group configuration information element (MBMS SCG configuration IE).

In this embodiment of this disclosure, optionally, the network side may alternatively indicate implicitly the terminal to perform the configuration operation.

That is, step 21 may include:

Step 211B: If the second information delivered by the network side is received, perform the configuration operation, where the second information includes one of the following:

configuration information for performing the configuration operation; and indication information used to indicate that the terminal is to perform the configuration operation.

If the second information delivered by the network side is not received, the configuration operation is not performed.

For example, if the configuration information for performing the configuration operation delivered by the network side is received, the configuration operation is performed. If the configuration information for performing the configuration operation delivered by the network side is not received, the configuration operation is not performed.

In the foregoing embodiment of this disclosure, optionally, when the network-side device indicates the terminal to perform the configuration operation related to reception of the target MBMS, the network-side device may further indicate information about a cell corresponding to the target MBMS to the terminal.

In this embodiment of this disclosure, if the network side indicates the information about the cell corresponding to the target MBMS to the terminal, the terminal may receive the target MBMS according to the cell information indicated by the network side, or may autonomously select a cell for receiving the target MBMS.

In this embodiment of this disclosure, optionally, the configuration operation includes at least one of the following:

adding a configuration related to reception of the target MBMS;

releasing a configuration related to reception of the target MBMS; and reconfiguring a configuration related to reception of the target MBMS.

Optionally, the reconfiguring a configuration related to reception of the target MBMS includes enabling or disabling a specific function for reception of the target MBMS. Optionally, the specific function is, for example, a header decompression function or a sequential delivery function.

In this embodiment of this disclosure, optionally, before the performing a configuration operation according to an indication of a network side, the method further includes reporting indication information of the target MBMS to the network side, so that the network side indicates, according to the indication information of the target MBMS, the terminal to perform the configuration operation.

The indication information of the target MBMS may include one of the following:

that the terminal is interested in the target MBMS;

that the terminal expects to start receiving the target MBMS;

that the target MBMS is about to start or has already started;

that the terminal is not interested in the target MBMS;

that the terminal expects to stop receiving the target MBMS;

that the target MBMS is about to end or has already ended; and reconfiguration information of the target MBMS.

The reconfiguration information of the target MBMS may include configuration information of a specific function for reception of the target MBMS, where the specific function includes at least one of the following: the target MBMS needs to perform header decompression processing, the target MBMS does not need to perform header decompression processing, the target MBMS requires sequential delivery, and the target MBMS does not require sequential delivery.

In this embodiment of this disclosure, optionally, the adding a configuration related to reception of the target MBMS includes: adding a protocol stack entity that receives the target MBMS.

In this embodiment of this disclosure, further optionally, the adding a configuration related to reception of the target MBMS further includes: using specified configuration information to configure the protocol stack entity, where the specified configuration information is prescribed by a protocol, indicated by the network side, or defined by the terminal. The specified configuration information prescribed by the protocol may be, for example, a default RLC mode, a default RLC SN size, or a default physical-layer configuration. The specified configuration information indicated by the network side may be, for example, rlc-config.

In this embodiment of this disclosure, optionally, the releasing a configuration related to reception of the target MBMS includes: releasing a protocol stack entity that receives the target MBMS.

In this embodiment of this disclosure, optionally, the protocol stack entity includes at least one of the following: a packet data convergence protocol (PDCP) entity, a radio link control protocol (RLC) entity, and a medium access control (MAC) entity.

Figure 3:
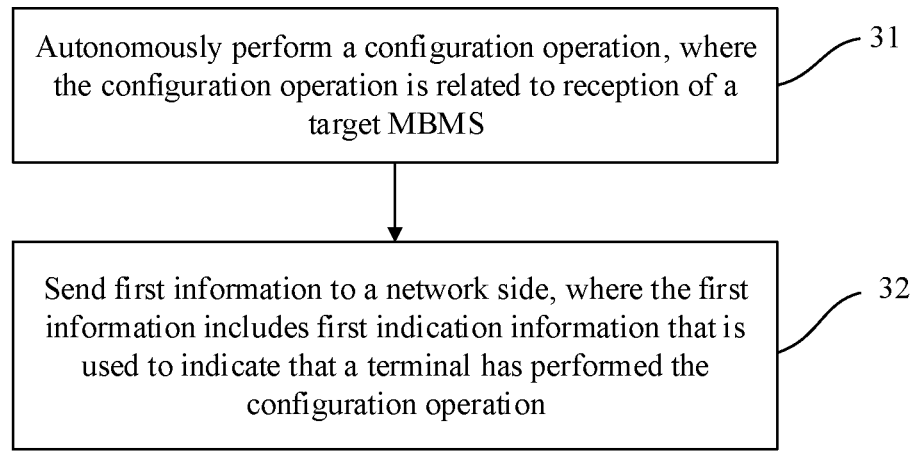
FIG. 3 is a schematic flowchart of a multimedia broadcast multicast service configuration method according to Embodiment 2 of this disclosure.

Referring to FIG. 3, FIG. 3 shows a multimedia broadcast multicast service configuration method according to Embodiment 2 of this disclosure. This method is applied to a terminal and includes the following steps.

Step 31: Autonomously perform a configuration operation, where the configuration operation is related to reception of a target MBMS; and Step 32: Send first information to a network side, where the first information includes first indication information that is used to indicate that the terminal has performed the configuration operation.

In this embodiment of this disclosure, the terminal autonomously performs the configuration operation related to reception of the target MBMS, and notifies the network-side device. In this way, the network-side device is able to learn about an MBMS reception status of the terminal, so as to perform unicast and multicast coordination and management. This ensures that unicast and multicast transmission within a scheduling time does not exceed a total capacity of the terminal (such as a total layer 2 buffer capacity of the terminal).

In this embodiment of this disclosure, optionally, the configuration operation includes at least one of the following:

adding a configuration related to reception of the target MBMS;

releasing a configuration related to reception of the target MBMS; and reconfiguring a configuration related to reception of the target MBMS.

The reconfiguring a configuration related to reception of the target MBMS includes enabling or disabling a specific function for reception of the target MBMS. Optionally, the specific function is, for example, a header decompression function or a sequential delivery function.

In this embodiment of this disclosure, optionally, the autonomously performing a configuration operation includes autonomously performing the configuration operation according to information related to the target MBMS.

If the information related to the target MBMS includes one of the following, the configuration operation includes adding a configuration related to reception of the target MBMS:
that the terminal is interested in the target MBMS;
that the terminal expects to start receiving the target MBMS; and
that the target MBMS is about to start or has already started.

If the information related to the target MBMS includes one of the following, the configuration operation includes releasing a configuration related to reception of the target MBMS:
that the terminal is not interested in the target MBMS;
that the terminal expects to stop receiving the target MBMS; and
that the target MBMS is about to end or has already ended.

In this embodiment of this disclosure, optionally, the adding a configuration related to reception of the target MBMS includes: adding a protocol stack entity that receives the target MBMS.

In this embodiment of this disclosure, further optionally, the adding a configuration related to reception of the target MBMS further includes: using specified configuration information to configure the protocol stack entity, where the specified configuration information is prescribed by a protocol, indicated by the network side, or defined by the terminal.

In this embodiment of this disclosure, optionally, the releasing a configuration related to reception of the target MBMS includes: releasing a protocol stack entity that receives the target MBMS.

In this embodiment of this disclosure, optionally, the protocol stack entity includes at least one of the following: a PDCP entity, an RLC entity, and a MAC entity.

In this embodiment of this disclosure, optionally, the first information may further include interest indication information of the target MBMS. The interest indication information of the target MBMS may be explicitly indicated. For example, the interest indication information of the target MBMS may carry an interest indication parameter, for example, 0 to 7 are used for indicating a degree of interest of the terminal in the target MBMS. Alternatively, the interest indication information of the target MBMS may be implicitly indicated. For example, when the terminal indicates to the network side, by using the first indication information, that the terminal has added a configuration for reception of the target MBMS, the terminal may further add an identifier of the target MBMS, a cell identity corresponding to the target MBMS, or a frequency identifier of a cell corresponding to the target MBMS, so that the network side can determine that the terminal is interested in the target MBMS.

In this embodiment of this disclosure, optionally, the terminal may autonomously select a cell corresponding to the target MBMS.

In the foregoing embodiments of this disclosure, optionally, the terminal may be a terminal in a connected state.

In the foregoing embodiments of this disclosure, optionally, the target MBMS is an MBMS in a non-serving cell.

In the foregoing embodiments of this disclosure, optionally, the target MBMS may be represented by using an identifier of the target MBMS, may be represented by using a frequency identifier corresponding to the target MBMS, or may be represented by using a cell identity corresponding to the target MBMS.

Figure 4:
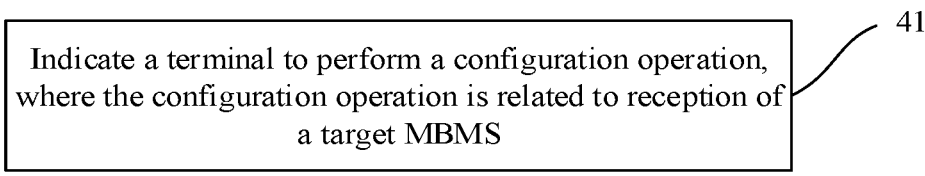
FIG. 4 is a schematic flowchart of a multimedia broadcast multicast service configuration method according to Embodiment 3 of this disclosure.

Referring to FIG. 4, FIG. 4 shows a multimedia broadcast multicast service configuration method according to Embodiment 3 of this disclosure. This method is applied to a network-side device and includes the following step.

Step 41: Indicate a terminal to perform a configuration operation, where the configuration operation is related to reception of a target MBMS.

In this embodiment of this disclosure, a network side indicates the terminal to perform the configuration operation related to reception of the target MBMS, so as to control MBMS reception of the terminal and perform unicast and multicast coordination and management. This ensures that unicast and multicast transmission within a scheduling time does not exceed a total capacity of the terminal (such as a total layer 2 buffer capacity of the terminal).

In this embodiment of this disclosure, optionally, the network side may indicate explicitly the terminal to perform the configuration operation.

That is, the indicating a terminal to perform a configuration operation includes delivering second indication information to the terminal, where the second indication information is used to indicate whether the terminal is to perform the configuration operation.

The second indication information may be, for example, 1 bit, where 1 means indicating the terminal to perform the configuration operation, and 0 means indicating the terminal not to perform the configuration operation; or 1 means indicating the terminal not to perform the configuration operation, and 0 means indicating the terminal to perform the configuration operation.

In this embodiment of this disclosure, optionally, the network side may alternatively indicate implicitly the terminal to perform the configuration operation.

That is, the indicating a terminal to perform a configuration operation includes, if it is determined that the terminal is to perform the configuration operation, delivering second information to the terminal, where the second information includes one of the following:
configuration information for performing the configuration operation; and
indication information used to indicate that the terminal is to perform the configuration operation.

If it is determined that the terminal is not to perform the configuration operation, the second information is not delivered.

In this embodiment of this disclosure, optionally, the configuration operation includes at least one of the following:
adding a configuration related to reception of the target MBMS;
releasing a configuration related to reception of the target MBMS; and
reconfiguring a configuration related to reception of the target MBMS.

Optionally, the reconfiguring a configuration related to reception of the target MBMS includes enabling or disabling a specific function for reception of the target MBMS.

Optionally, the specific function is, for example, a header decompression function or a sequential delivery function.

Optionally, before the indicating a terminal to perform a configuration operation, the following is further included:

receiving indication information, sent by the terminal, of the target MBMS.

If the indication information of the target MBMS includes one of the following, the configuration operation includes adding a configuration related to reception of the target MBMS:

that the terminal is interested in the target MBMS;
that the terminal expects to start receiving the target MBMS; and
that the target MBMS is about to start or has already started.

Optionally, before the indicating a terminal to perform a configuration operation, the following is further included:

receiving indication information, sent by the terminal, of the target MBMS.

If the indication information of the target MBMS includes one of the following, the configuration operation includes releasing a configuration related to reception of the target MBMS:

that the terminal is not interested in the target MBMS;
that the terminal expects to stop receiving the target MBMS; and
that the target MBMS is about to end or has already ended.

In this embodiment of this disclosure, optionally, when the network-side device indicates the terminal to perform the configuration operation, the network-side device may further indicate information about a cell corresponding to the target MBMS to the terminal.

Figure 5:
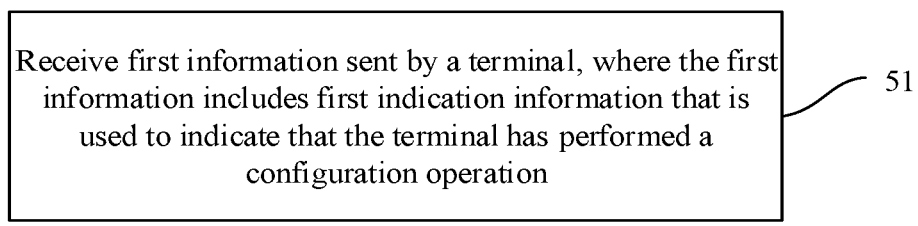
FIG. 5 is a schematic flowchart of a multimedia broadcast multicast service configuration method according to Embodiment 4 of this disclosure.

Referring to FIG. 5, FIG. 5 shows a multimedia broadcast multicast service configuration method according to Embodiment 4 of this disclosure. This method is applied to a network-side device and includes the following step.

Step 51: Receive first information sent by a terminal, where the first information includes first indication information that is used to indicate that the terminal has performed the configuration operation.

In this embodiment of this disclosure, the network-side device may learn about an MBMS reception status of the terminal by using the first information, so as to perform unicast and multicast coordination and management, thereby ensuring that unicast and multicast transmission within a scheduling time does not exceed a total capacity of the terminal (such as a total layer 2 buffer capacity of the terminal).

In this embodiment of this disclosure, optionally, the configuration operation includes at least one of the following:

adding a configuration related to reception of the target MBMS;
releasing a configuration related to reception of the target MBMS; and
reconfiguring a configuration related to reception of the target MBMS.

Optionally, the reconfiguring a configuration related to reception of the target MBMS includes enabling or disabling a specific function for reception of the target MBMS. Optionally, the specific function is, for example, a header decompression function or a sequential delivery function.

Figure 6:
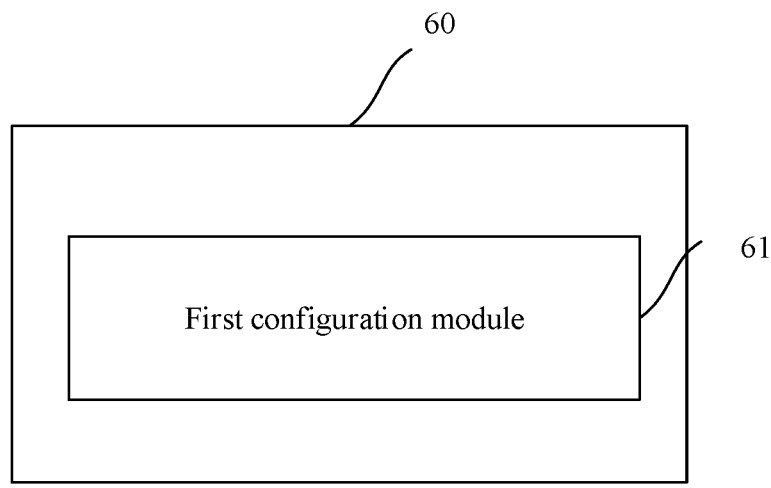
FIG. 6 is a schematic structural diagram of a terminal according to Embodiment 5 of this disclosure.

Referring to FIG. 6, FIG. 6 is a schematic structural diagram of a terminal according to Embodiment 5 of this disclosure. The terminal 60 includes:

a first configuration module 61, configured to perform a configuration operation according to an indication of a network side, where the configuration operation is related to reception of a target MBMS.

Optionally, the first configuration module 61 includes:

a first receiving unit, configured to receive second indication information delivered by the network side, where the second indication information is used to indicate whether the terminal is to perform the configuration operation.

Optionally, the first configuration module 61 includes:

a second processing module, configured to perform the configuration operation if the second information delivered by the network side is received, where the second information includes one of the following:

configuration information for performing the configuration operation; and
indication information used to indicate that the terminal is to perform the configuration operation.

Optionally, the configuration operation includes at least one of the following:

adding a configuration related to reception of the target MBMS;
releasing a configuration related to reception of the target MBMS; and
reconfiguring a configuration related to reception of the target MBMS.

Optionally, the terminal further includes:

a reporting module, configured to report indication information of the target MBMS to the network side, where the indication information of the target MBMS includes one of the following:

that the terminal is interested in the target MBMS;
that the terminal expects to start receiving the target MBMS;
that the target MBMS is about to start or has already started;
that the terminal is not interested in the target MBMS;
that the terminal expects to stop receiving the target MBMS; and
that the target MBMS is about to end or has already ended.

Optionally, the adding a configuration related to reception of the target MBMS includes: adding a protocol stack entity that receives the target MBMS.

Optionally, the adding a configuration related to reception of the target MBMS further includes: using specified configuration information to configure the protocol stack entity, where the specified configuration information is prescribed by a protocol, indicated by the network side, or defined by the terminal.

Optionally, the releasing a configuration related to reception of the target MBMS includes: releasing a protocol stack entity that receives the target MBMS.

Figure 7:
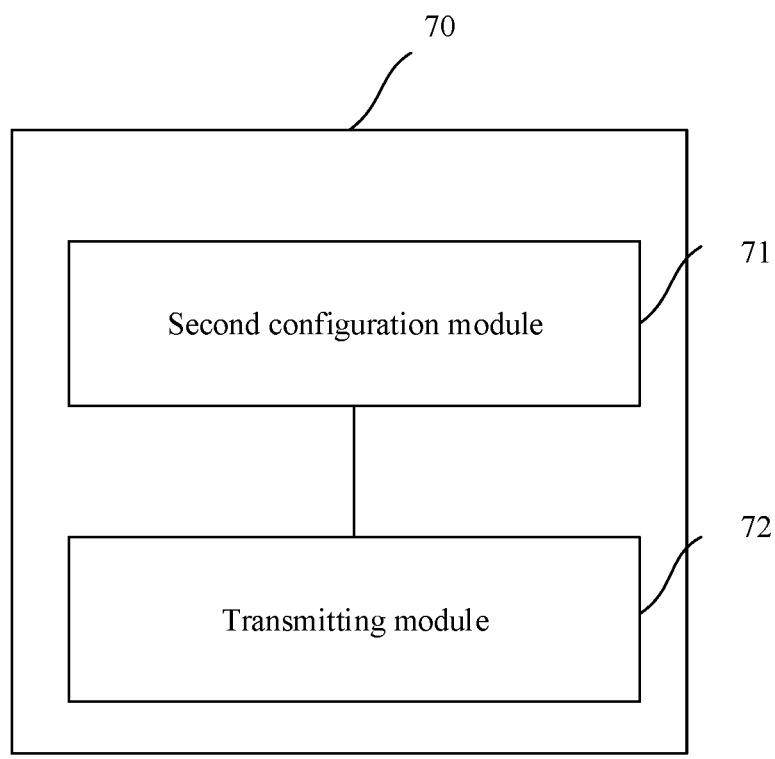
FIG. 7 is a schematic structural diagram of a terminal according to Embodiment 6 of this disclosure.

Referring to FIG. 7, FIG. 7 is a schematic structural diagram of a terminal according to Embodiment 6 of this disclosure. The terminal 70 includes:

a second configuration module 71, configured to autonomously perform a configuration operation; and
a transmitting module 72, configured to send first information to the network side, where the first information includes first indication information that is used to indicate that the terminal has performed the configuration operation.

Optionally, the configuration operation includes at least one of the following:

adding a configuration related to reception of the target MBMS;

releasing a configuration related to reception of the target MBMS; and reconfiguring a configuration related to reception of the target MBMS.

Optionally, the second configuration module is configured to: according to information related to the target MBMS, autonomously perform a configuration operation related to reception of the target MBMS.

If the information related to the target MBMS includes one of the following, the configuration operation includes adding a configuration related to reception of the target MBMS:

that the terminal is interested in the target MBMS;
that the terminal expects to start receiving the target MBMS; and
that the target MBMS is about to start or has already started.

If the information related to the target MBMS includes one of the following, the configuration operation includes releasing a configuration related to reception of the target MBMS:

that the terminal is not interested in the target MBMS;
that the terminal expects to stop receiving the target MBMS; and
that the target MBMS is about to end or has already ended.

Optionally, the adding a configuration related to reception of the target MBMS includes: adding a protocol stack entity that receives the target MBMS.

Optionally, the adding a configuration related to reception of the target MBMS further includes: using specified configuration information to configure the protocol stack entity, where the specified configuration information is prescribed by a protocol, indicated by the network side, or defined by the terminal.

Optionally, the releasing a configuration related to reception of the target MBMS includes: releasing a protocol stack entity that receives the target MBMS.

Optionally, the first information further includes interest indication information of the target MBMS.

The terminal provided in this embodiment of this disclosure is capable of implementing various processes that are implemented by the terminal in the method embodiments of FIG. 2 and FIG. 3. To avoid repetition, details are not described herein again.

Figure 8:
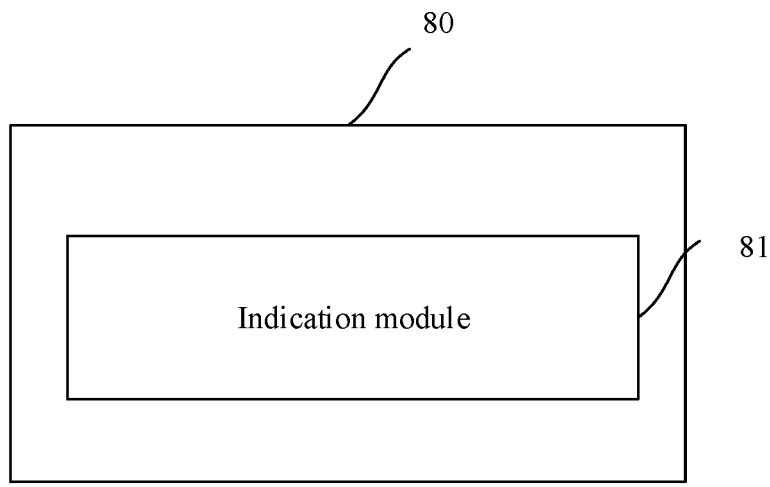
FIG. 8 is a schematic structural diagram of a network-side device according to Embodiment 7 of this disclosure.

Referring to FIG. 8, FIG. 8 is a schematic structural diagram of a network-side device according to Embodiment 7 of this disclosure. The network-side device 80 includes:

an indication module 81, configured to indicate a terminal to perform a configuration operation, where the configuration operation is related to reception of a target MBMS.

Optionally, the indication module includes:
a first delivery module, configured to deliver second indication information to the terminal, where the second indication information is used to indicate whether the terminal is to perform the configuration operation.

Optionally, the indication module includes:
a second delivery module, configured to, if it is determined that the terminal is to perform the configuration operation, deliver second information to the terminal, where
the second information includes one of the following:
configuration information for performing the configuration operation; and indication information used to indicate that the terminal is to perform the configuration operation.

Optionally, the configuration operation includes at least one of the following:

adding a configuration related to reception of the target MBMS;

releasing a configuration related to reception of the target MBMS; and reconfiguring a configuration related to reception of the target MBMS.

Optionally, the network-side device further includes:
a receiving module, configured to receive indication information, sent by the terminal, of the target MBMS.

The indication module is configured to, if the indication information of the target MBMS includes one of the following, indicate the terminal to add a configuration related to reception of the target MBMS:

that the terminal is interested in the target MBMS;
that the terminal expects to start receiving the target MBMS; and
that the target MBMS is about to start or has already started.

The indication module is configured to, if the indication information of the target MBMS includes one of the following, indicate the terminal to release a configuration related to reception of the target MBMS:

that the terminal is not interested in the target MBMS;
that the terminal expects to stop receiving the target MBMS; and
that the target MBMS is about to end or has already ended.

Figure 9:
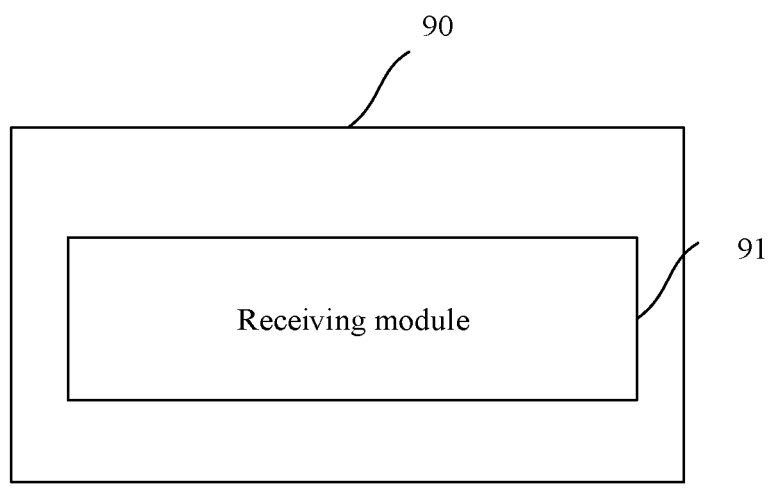
FIG. 9 is a schematic structural diagram of a network-side device according to Embodiment 8 of this disclosure.

Referring to FIG. 9, FIG. 9 is a schematic structural diagram of a network-side device according to Embodiment 8 of this disclosure. The network-side device 90 includes:

a receiving module 91, configured to receive first information sent by a terminal, where the first information includes first indication information that is used to indicate that the terminal has performed the configuration operation.

Optionally, the configuration operation includes at least one of the following:

adding a configuration related to reception of the target MBMS;

releasing a configuration related to reception of the target MBMS; and reconfiguring a configuration related to reception of the target MBMS.

The network-side device provided in this embodiment of this disclosure is capable of implementing various processes that are implemented by the network-side device in the method embodiments of FIG. 4 and FIG. 5. To avoid repetition, details are not described herein again.

Figure 10:
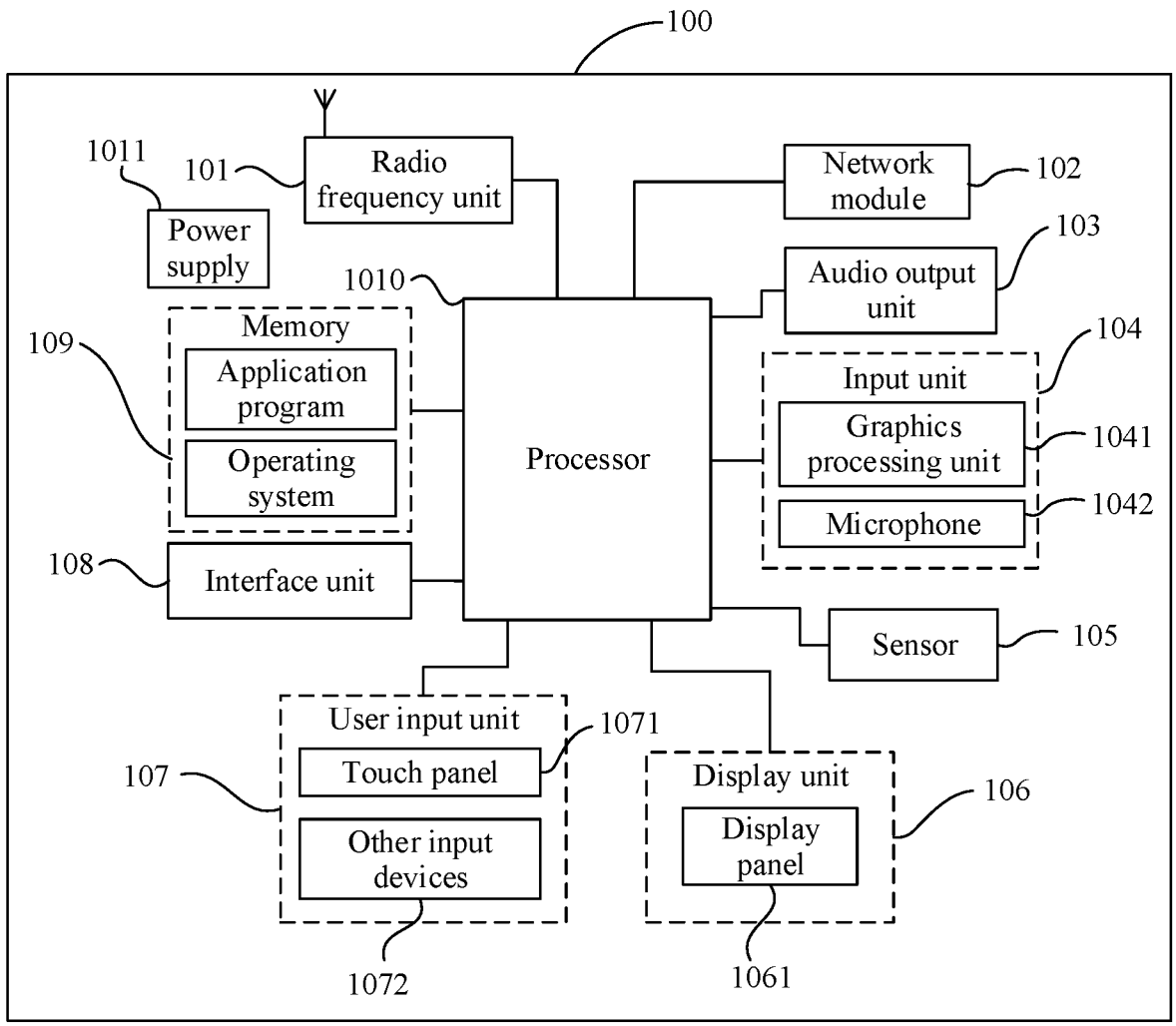
FIG. 10 is a schematic structural diagram of a terminal according to Embodiment 9 of this disclosure.

Referring to FIG. 10, FIG. 10 is a schematic structural diagram of a terminal according to Embodiment 9 of this disclosure. The terminal 100 includes but is not limited to components such as a radio frequency unit 101, a network module 102, an audio output unit 103, an input unit 104, a sensor 105, a display unit 106, a user input unit 107, an interface unit 108, a memory 109, a processor 1010, and a power supply 1011. A person skilled in the art may understand that the structure of the terminal shown in FIG. 10 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The processor 1010 is configured to perform a configuration operation according to an indication of a network side, where the configuration operation is related to reception of a target MBMS;

or the processor 1010 is configured to autonomously perform a configuration operation; and the radio frequency unit 101 is configured to send first information to the network side, where the first information includes first indication information that is used to indicate that the terminal has performed the configuration operation.

In this embodiment of this disclosure, the terminal performs, according to the indication of the network side, the configuration operation related to reception of the target MBMS, or autonomously performs the configuration operation related to reception of the target MBMS and notifies the network-side device. In this way, the network-side device is able to control MBMS reception of the terminal or learn about an MBMS reception status of the terminal, so as to perform unicast and multicast coordination and management. This ensures that unicast and multicast transmission within a scheduling time does not exceed a total capacity of the terminal (such as a total layer 2 buffer capacity of the terminal).

It should be understood that, in this embodiment of this disclosure, the radio frequency unit 101 may be configured to transmit or receive a signal in an information transmitting/receiving or call process. Specifically, the radio frequency unit 101 receives downlink data from a base station, transmits the downlink data to the processor 1010 for processing, and transmits uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and another device through a wireless communications system.

The terminal provides wireless broadband internet access for a user by using the network module 102, for example, helps the user send and receive e-mails, browse web pages, and access streaming media.

The audio output unit 103 may convert audio data received by the radio frequency unit 101 or the network module 102 or stored in the memory 109 into an audio signal, and output the audio signal as a sound. In addition, the audio output unit 103 may further provide audio output (for example, a call signal reception tone or a message reception tone) that is related to a specific function performed by the terminal 100. The audio output unit 103 includes a speaker, a buzzer, a telephone receiver, and the like.

The input unit 104 is configured to receive an audio or video signal. The input unit 104 may include a graphics processing unit (GPU) 1041 and a microphone 1042, and the graphics processing unit 1041 processes image data of a static picture or a video that is obtained by an image capture apparatus (for example, a camera) in an image capture mode or a video capture mode. A processed image frame may be displayed on the display unit 106. The image frame processed by the graphics processing unit 1041 may be stored in the memory 109 (or another storage medium) or transmitted by using the radio frequency unit 101 or the network module 102. The microphone 1042 is capable of receiving sounds and processing such sounds into audio data. The processed audio data can be converted in a telephone call mode into a format that can be transmitted by the radio frequency unit 101 to a mobile communication base station, for outputting.

The terminal 100 further includes at least one sensor 105, for example, an optical sensor, a motion sensor, and other sensors. Specifically, the optical sensor includes an ambient light sensor and a proximity sensor. The ambient light sensor may adjust brightness of a display panel 1061 based on intensity of ambient light. When the terminal 100 moves near an ear, the proximity sensor may disable the display panel 1061 and/or backlight. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as a pedometer and tapping), and the like. The sensor 105 may also include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided to the user. The display unit 106 may include the display panel 1061. The display panel 1061 may be configured in a form of a liquid crystal display (LCD), an organic light-emitting diode (OLED), or the like.

The user input unit 107 may be configured to receive input digit or character information, and generate key signal input that is related to user setting and function control of the terminal. Specifically, the user input unit 107 includes a touch panel 1071 and other input devices 1072. The touch panel 1071, or referred to as a touchscreen, may capture a touch operation performed by a user on or near the touch panel 1071 (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch direction of the user, detects a signal brought by a touch operation, and transmits the signal to the touch controller. The touch controller receives touch information from the touch detection apparatus, converts the touch information to touchpoint coordinates, transmits the touchpoint coordinates to the processor 1010, and receives and executes a command transmitted by the processor 1010. In addition, the touch panel 1071 may be implemented in a plurality of forms, for example, as a resistive, capacitive, infrared, or surface acoustic wave touch panel. In addition to the touch panel 1071, the user input unit 107 may further include other input devices 1072. Specifically, the other input devices 1072 may include but are not limited to a physical keyboard, a function key (for example, a volume control key or a switch key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 1010 for determining a type of the touch event. Then, the processor 1010 provides a corresponding visual output on the display panel 1061 based on the type of the touch event. Although the touch panel 1071 and the display panel 1061 are used as two separate components to implement input and output functions of the terminal in FIG. 10, the touch panel 1071 and the display panel 1061 may be integrated to implement the input and output functions of the terminal in some embodiments. This is not specifically limited herein.

The interface unit 108 is an interface for connecting an external apparatus to the terminal 100. For example, the external apparatus may include a wired or wireless headphone port, an external power supply (or battery charger) port, a wired or wireless data port, a memory card port, a port for connecting an apparatus provided with an identification module, an audio input/output (I/O) port, a video I/O port, or an earphone port. The interface unit 108 may be configured to: receive input (for example, data information and power) from the external apparatus, and transmit the received input to one or more elements in the terminal 100, or may be configured to transmit data between the terminal 100 and the external apparatus.

The memory 109 may be configured to store a software program and various data. The memory 109 may primarily include a program storage area and a data storage area. The program storage area may store an operating system, an application program (such as a sound play function and an image play function) required for at least one function, and the like. The data storage area may store data (such as audio data and a phone book) created based on use of a mobile phone. In addition, the memory 109 may include a high-speed random access memory, and may include a non-volatile memory, for example, at least one magnetic disk storage device, a flash memory device, or another volatile solid-state storage device.

The processor 1010 is a control center of the terminal, and is connected to all components of the terminal by using various interfaces and lines. By running or executing a software program and/or a module stored in the memory 109 and invoking data stored in the memory 109, the processor 1010 executes various functions of the terminal and processes data, so as to perform overall monitoring on the terminal. The processor 1010 may include one or more processing units. Optionally, the processor 1010 may integrate an application processor and a modem processor. The application processor mainly processes an operating system, a user interface, an application program, and the like. The modem processor mainly processes wireless communication. It may be understood that the modem processor may alternatively be not integrated into the processor 1010.

The terminal 100 may further include a power supply 1011 (for example, a battery) that supplies power to the components. Optionally, the power supply 1011 may be logically connected to the processor 1010 by using a power management system, so as to implement functions such as charging management, discharging management, and power consumption management by using the power management system.

In addition, the terminal 100 includes some functional modules that are not shown. Details are not described herein.

Figure 11:
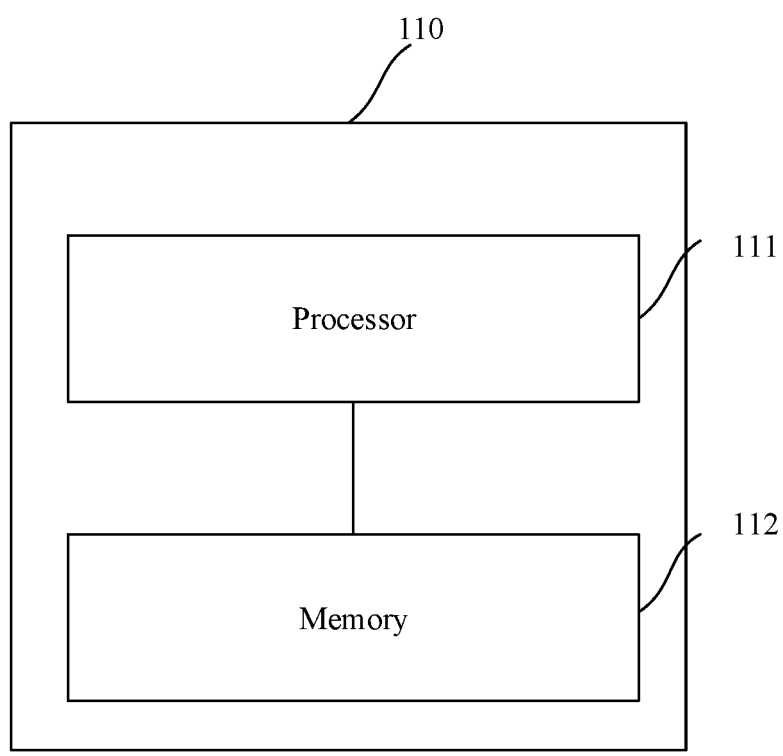
FIG. 11 is a schematic structural diagram of a terminal according to Embodiment 10 of this disclosure.

Referring to FIG. 11, FIG. 11 is a schematic structural diagram of a terminal according to Embodiment 10 of this disclosure. The terminal 110 includes a processor 111 and a memory 112. In this embodiment of this disclosure, the terminal 110 further includes a computer program stored in the memory 112 and capable of running on the processor 111, where when the computer program is executed by the processor 111, the following step is implemented:

performing a configuration operation according to an indication of a network side, where the configuration operation is related to reception of a target MBMS; or autonomously performing a configuration operation and sending first information to a network side, where the first information includes first indication information that is used to indicate that the terminal has performed the configuration operation.

Optionally, when the computer program is executed by the processor 111, the following step may be further implemented:

the performing a configuration operation related to reception of a target MBMS according to an indication of a network side includes:

receiving second indication information delivered by the network side, where the second indication information is used to indicate whether the terminal is to perform the configuration operation.

Optionally, when the computer program is executed by the processor 111, the following step may be further implemented:

the performing a configuration operation according to an indication of a network side includes:

if second information delivered by the network side is received, performing the configuration operation; where the second information includes one of the following:

configuration information for performing the configuration operation; and indication information used to indicate that the terminal is to perform the configuration operation.

Optionally, the configuration operation includes at least one of the following:

adding a configuration related to reception of the target MBMS;

releasing a configuration related to reception of the target MBMS; and reconfiguring a configuration related to reception of the target MBMS.

Optionally, when the computer program is executed by the processor 111, the following step may be further implemented:

before the performing a configuration operation according to an indication of a network side, the following step is further included:

reporting indication information of the target MBMS to the network side, where the indication information of the target MBMS includes one of the following:

that the terminal is interested in the target MBMS;

that the terminal expects to start receiving the target MBMS;

that the target MBMS is about to start or has already started;

that the terminal is not interested in the target MBMS;

that the terminal expects to stop receiving the target MBMS; and that the target MBMS is about to end or has already ended.

Optionally, when the computer program is executed by the processor 111, the following step may be further implemented:

the autonomously performing a configuration operation includes:

autonomously performing a configuration operation according to information related to the target MBMS, where if the information related to the target MBMS includes one of the following, the configuration operation includes adding a configuration related to reception of the target MBMS:
that the terminal is interested in the target MBMS;
that the terminal expects to start receiving the target MBMS; and
that the target MBMS is about to start or has already started.

Optionally, when the computer program is executed by the processor 111, the following step may be further implemented:
the autonomously performing a configuration operation includes:
autonomously performing a configuration operation according to information related to the target MBMS, where
if the information related to the target MBMS includes one of the following, the configuration operation includes releasing a configuration related to reception of the target MBMS:
that the terminal is not interested in the target MBMS;
that the terminal expects to stop receiving the target MBMS; and
that the target MBMS is about to end or has already ended.

Optionally, the adding a configuration related to reception of the target MBMS includes: adding a protocol stack entity that receives the target MBMS.

Optionally, the adding a configuration related to reception of the target MBMS further includes: using specified configuration information to configure the protocol stack entity, where the specified configuration information is prescribed by a protocol, indicated by the network side, or defined by the terminal.

Optionally, the releasing a configuration related to reception of the target MBMS includes: releasing a protocol stack entity that receives the target MBMS.

Optionally, the first information further includes interest indication information of the target MBMS.

Figure 12:
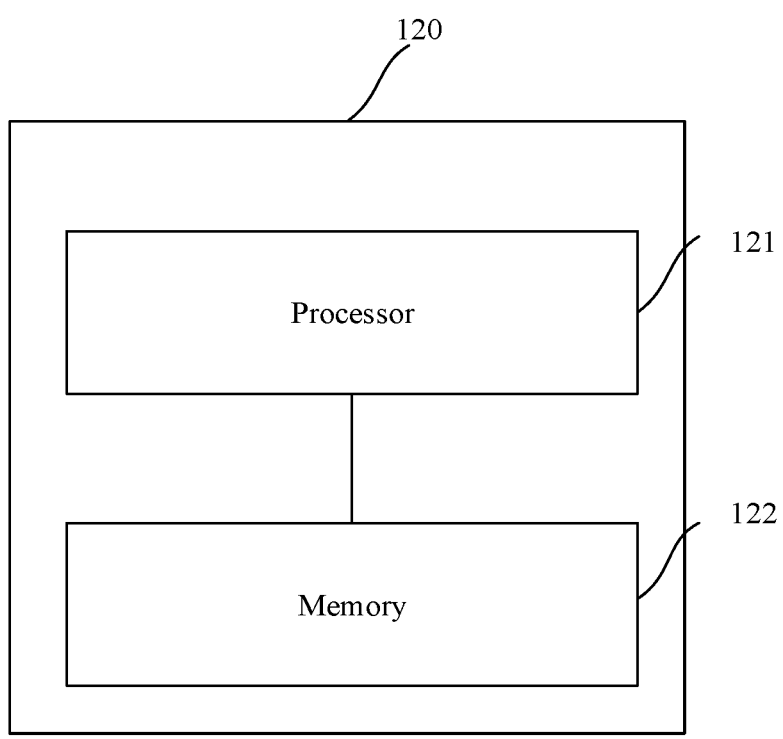
FIG. 12 is a schematic structural diagram of a network-side device according to Embodiment 11 of this disclosure.

Referring to FIG. 12, FIG. 12 is schematic structural diagram of a network-side device according to Embodiment 11 of this disclosure. The network-side device 120 includes a processor 121 and a memory 122. In this embodiment of this disclosure, the network-side device 120 further includes a computer program stored in the memory 122 and capable of running on the processor 121, where when the computer program is executed by the processor 121, the following step is implemented:
indicating a terminal to perform a configuration operation, where the configuration operation is related to reception of a target MBMS;
or
receiving first information sent by a terminal, where the first information includes first indication information that is used to indicate that the terminal has performed the configuration operation.

Optionally, when the computer program is executed by the processor 121, the following step may be further implemented:
the indicating the terminal to perform the configuration operation includes:
delivering second indication information to the terminal, where the second indication information is used to indicate whether the terminal is to perform the configuration operation.

Optionally, when the computer program is executed by the processor 121, the following step may be further implemented:
the indicating the terminal to perform the configuration operation includes:
if it is determined that the terminal is to perform the configuration operation, delivering second information to the terminal, where
the second information includes one of the following:
configuration information for performing the configuration operation; and
indication information used to indicate that the terminal is to perform the configuration operation.

Optionally, the configuration operation includes at least one of the following:
adding a configuration related to reception of the target MBMS;
releasing a configuration related to reception of the target MBMS; and
reconfiguring a configuration related to reception of the target MBMS.

Optionally, when the computer program is executed by the processor 121, the following step may be further implemented:
before the indicating the terminal to perform the configuration operation, the following steps are further included:
receiving indication information, sent by the terminal, of the target MBMS; and
if the indication information of the target MBMS includes one of the following, indicating the terminal to add a configuration related to reception of the target MBMS:
that the terminal is interested in the target MBMS;
that the terminal expects to start receiving the target MBMS; and
that the target MBMS is about to start or has already started.

Optionally, when the computer program is executed by the processor 121, the following step may be further implemented:
before the indicating the terminal to perform the configuration operation, the following steps are further included:
receiving indication information, sent by the terminal, of the target MBMS; and
if the indication information of the target MBMS includes one of the following, indicating the terminal to release a configuration related to reception of the target MBMS:
that the terminal is not interested in the target MBMS;
that the terminal expects to stop receiving the target MBMS; and
that the target MBMS is about to end or has already ended.

An embodiment of this disclosure further provides a computer-readable storage medium, where a computer program is stored in the computer-readable storage medium. When the computer program is executed by a processor, processes of the foregoing embodiment of the multimedia broadcast multicast service configuration method are implemented, with the same technical effect achieved. To avoid repetition, details are not described herein again. The computer-readable storage medium is, for example, a read-only memory (ROM), a random access memory (RAM), a magnetic disk, or an optical disc.

It should be noted that in this specification, the term "include", "comprise", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disk), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to these embodiments. These embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. A multimedia broadcast multicast service configuration method, performed by a terminal and comprising:
    performing a configuration operation according to an indication from a network side, wherein the configuration operation is related to reception of a target multimedia broadcast multicast service (MBMS);
    or
    autonomously performing the configuration operation and sending first information to a network side, wherein the first information comprises first indication information that is used to indicate that the terminal has performed the configuration operation;
    wherein the configuration operation comprises at least one of the following:
    adding a configuration related to reception of the target MBMS;
    releasing a configuration related to reception of the target MBMS; and
    reconfiguring a configuration related to reception of the target MBMS;
    wherein the adding a configuration related to reception of the target MBMS comprises:
    adding a protocol stack entity that receives the target MBMS;
    wherein the releasing a configuration related to reception of the target MBMS comprises:
    releasing a protocol stack entity that receives the target MBMS;
    wherein the reconfiguring a configuration related to reception of the target MBMS comprises:
    reconfiguring a protocol stack entity that receives the target MBMS;
    wherein the protocol stack entity comprises at least one of the following: a packet data convergence protocol (PDCP) entity, a radio link control protocol (RLC) entity, and a medium access control (MAC) entity.

2. The method according to claim 1, wherein the performing a configuration operation according to an indication from a network side comprises:
    receiving second indication information delivered by the network side, wherein the second indication information is used to indicate whether the terminal is to perform the configuration operation.

3. The method according to claim 1, wherein the performing a configuration operation according to an indication of from a network side comprises:
    if second information delivered by the network side is received, performing the configuration operation; wherein
    the second information comprises one of the following:
    configuration information for performing the configuration operation; and
    indication information used to indicate that the terminal is to perform the configuration operation.

4. The method according to claim 1, before the performing a configuration operation according to an indication from a network side, further comprising:
    reporting indication information of the target MBMS to the network side, wherein
    the indication information of the target MBMS comprises one of the following:
    that the terminal is interested in the target MBMS;
    that the terminal expects to start receiving the target MBMS;
    that the target MBMS is about to start or has already started;
    that the terminal is not interested in the target MBMS;
    that the terminal expects to stop receiving the target MBMS; and
    that the target MBMS is about to end or has already ended.

5. The method according to claim 1, wherein the autonomously performing the configuration operation comprises:
    autonomously performing the configuration operation according to information related to the target MBMS, wherein
    if the information related to the target MBMS comprises one of the following, the configuration operation comprises adding a configuration related to reception of the target MBMS:
    that the terminal is interested in the target MBMS;
    that the terminal expects to start receiving the target MBMS; and
    that the target MBMS is about to start or has already started.

6. The method according to claim 1, wherein the autonomously performing the configuration operation comprises:
    autonomously performing the configuration operation according to information related to the target MBMS, wherein
    if the information related to the target MBMS comprises one of the following, the configuration operation comprises releasing a configuration related to reception of the target MBMS:
    that the terminal is not interested in the target MBMS;
    that the terminal expects to stop receiving the target MBMS; and
    that the target MBMS is about to end or has already ended.

7. The method according to claim 1, wherein the adding a configuration related to reception of the target MBMS further comprises:
    using specified configuration information to configure the protocol stack entity, wherein
    the specified configuration information is prescribed by a protocol, indicated by the network side, or defined by the terminal.

8. The method according to claim 1, wherein the first information further comprises interest indication information of the target MBMS.

9. A multimedia broadcast multicast service configuration method, performed by a network-side device and comprising:
    indicating to a terminal to perform a configuration operation, wherein the configuration operation is related to reception of a target multimedia broadcast multicast service (MBMS);
    or
    receiving first information sent by a terminal, wherein the first information comprises first indication information that is used to indicate that the terminal has performed the configuration operation;
    wherein the configuration operation comprises at least one of the following:
    adding a configuration related to reception of the target MBMS;
    releasing a configuration related to reception of the target MBMS; and
    reconfiguring a configuration related to reception of the target MBMS;
    wherein the adding a configuration related to reception of the target MBMS comprises:
    adding a protocol stack entity that receives the target MBMS;
    wherein the releasing a configuration related to reception of the target MBMS comprises:
    releasing a protocol stack entity that receives the target MBMS;
    wherein the reconfiguring a configuration related to reception of the target MBMS comprises:
    reconfiguring a protocol stack entity that receives the target MBMS;
    wherein the protocol stack entity comprises at least one of the following: a packet data convergence protocol (PDCP) entity, a radio link control protocol (RLC) entity, and a medium access control (MAC) entity.

10. The method according to claim 9, wherein the indicating to a terminal to perform a configuration operation comprises:
    delivering second indication information to the terminal, wherein the second indication information is used to indicate whether the terminal is to perform the configuration operation.

11. The method according to claim 9, wherein the indicating to a terminal to perform a configuration operation comprises:
    if it is determined that the terminal is to perform the configuration operation, delivering second information to the terminal, wherein
    the second information comprises one of the following:
    configuration information for performing the configuration operation; and
    indication information used to indicate that the terminal is to perform the configuration operation.

12. The method according to claim 9, before the indicating to a terminal to perform a configuration operation, further comprising:
    receiving indication information, sent by the terminal, of the target MBMS; and
    if the indication information of the target MBMS comprises one of the following, indicating to the terminal to add a configuration related to reception of the target MBMS:
    that the terminal is interested in the target MBMS;
    that the terminal expects to start receiving the target MBMS; and
    that the target MBMS is about to start or has already started.

13. The method according to claim 9, before the indicating to a terminal to perform a configuration operation, further comprising:
    receiving indication information, sent by the terminal, of the target MBMS; and
    if the indication information of the target MBMS comprises one of the following, indicating to the terminal to release a configuration related to reception of the target MBMS:
    that the terminal is not interested in the target MBMS;
    that the terminal expects to stop receiving the target MBMS; and
    that the target MBMS is about to end or has already ended.

14. A terminal, comprising a processor, a memory, and a computer program stored in the memory and capable of running on the processor, wherein when the computer program is executed by the processor, the following steps are implemented:
    performing a configuration operation according to an indication from a network side, wherein the configuration operation is related to reception of a target multimedia broadcast multicast service (MBMS);
    or
    autonomously performing the configuration operation and sending first information to a network side, wherein the first information comprises first indication information that is used to indicate that the terminal has performed the configuration operation;
    wherein the configuration operation comprises at least one of the following:
    adding a configuration related to reception of the target MBMS;
    releasing a configuration related to reception of the target MBMS; and
    reconfiguring a configuration related to reception of the target MBMS;
    wherein the adding a configuration related to reception of the target MBMS comprises:
    adding a protocol stack entity that receives the target MBMS;
    wherein the releasing a configuration related to reception of the target MBMS comprises:
    releasing a protocol stack entity that receives the target MBMS;
    wherein the reconfiguring a configuration related to reception of the target MBMS comprises:
    reconfiguring a protocol stack entity that receives the target MBMS;
    wherein the protocol stack entity comprises at least one of the following: a packet data convergence protocol (PDCP) entity, a radio link control protocol (RLC) entity, and a medium access control (MAC) entity.

15. The terminal according to claim 14, wherein the performing a configuration operation according to an indication from a network side comprises:
  receiving second indication information delivered by the network side, wherein the second indication information is used to indicate whether the terminal is to perform the configuration operation.

16. The terminal according to claim 14, wherein the performing a configuration operation according to an indication from a network side comprises:
  if second information delivered by the network side is received, performing the configuration operation; wherein
  the second information comprises one of the following:
  configuration information for performing the configuration operation; and
  indication information used to indicate that the terminal is to perform the configuration operation.

17. The terminal according to claim 14, before the performing a configuration operation according to an indication from a network side, further comprising:
  reporting indication information of the target MBMS to the network side, wherein
  the indication information of the target MBMS comprises one of the following:
  that the terminal is interested in the target MBMS;
  that the terminal expects to start receiving the target MBMS;
  that the target MBMS is about to start or has already started;
  that the terminal is not interested in the target MBMS;
  that the terminal expects to stop receiving the target MBMS; and
  that the target MBMS is about to end or has already ended.

18. The terminal according to claim 14, wherein the autonomously performing the configuration operation comprises:
  autonomously performing the configuration operation according to information related to the target MBMS, wherein
  if the information related to the target MBMS comprises one of the following, the configuration operation comprises adding a configuration related to reception of the target MBMS:
  that the terminal is interested in the target MBMS;
  that the terminal expects to start receiving the target MBMS; and
  that the target MBMS is about to start or has already started.

19. The terminal according to claim 14, wherein the autonomously performing the configuration operation comprises:
  autonomously performing the configuration operation according to information related to the target MBMS, wherein
  if the information related to the target MBMS comprises one of the following, the configuration operation comprises releasing a configuration related to reception of the target MBMS:
  that the terminal is not interested in the target MBMS;
  that the terminal expects to stop receiving the target MBMS; and
  that the target MBMS is about to end or has already ended.

20. The terminal according to claim 14, wherein the adding a configuration related to reception of the target MBMS further comprises:
  using specified configuration information to configure the protocol stack entity, wherein
  the specified configuration information is prescribed by a protocol, indicated by the network side, or defined by the terminal.

\* \* \* \* \*